United States Patent
Slattery (10) Patent No.: US 11,104,484 B2
(45) Date of Patent: Aug. 31, 2021

(54) UTILITY BRACKET FOR PORTABLE STORAGE CONTAINERS

(71) Applicant: Darren J. Slattery, Boulder, CO (US)

(72) Inventor: Darren J. Slattery, Boulder, CO (US)

( * ) Notice: Subject to any disclaimer, the term of this patent is extended or adjusted under 35 U.S.C. 154(b) by 0 days.

(21) Appl. No.: 16/146,082

(22) Filed: Sep. 28, 2018

(65) Prior Publication Data

US 2019/0092528 A1 Mar. 28, 2019

Related U.S. Application Data

(60) Provisional application No. 62/564,440, filed on Sep. 28, 2017.

(51) Int. Cl.
| | | |
|---|---|---|
| *B65D 25/20* | (2006.01) | |
| *B65D 43/16* | (2006.01) | |
| *F16M 13/02* | (2006.01) | |
| *B65D 81/38* | (2006.01) | |
| *B60N 3/10* | (2006.01) | |

(52) U.S. Cl.
CPC .............. *B65D 25/20* (2013.01); *B60N 3/102* (2013.01); *B60N 3/104* (2013.01); *B65D 43/16* (2013.01); *B65D 81/38* (2013.01); *B65D 81/3813* (2013.01); *F16M 13/022* (2013.01)

(58) Field of Classification Search
CPC ........ B65D 25/20; B65D 43/16; B65D 81/38; B65D 81/3813; B60N 3/102; B60N 3/104
USPC .......... 248/213.2, 247, 248, 300, 310, 311.2, 248/312.1; 206/427, 429, 476, 486, 487, 206/558, 557, 560, 564, 567; 220/592.16, 220/592.18, 23.4, 737, 23.2; 211/71.01, 211/74, 75
See application file for complete search history.

(56) References Cited

U.S. PATENT DOCUMENTS

| | | | | |
|---|---|---|---|---|
| 1,888,127 | A * | 11/1932 | Hearne | A47G 29/06 248/207 |
| 2,142,868 | A * | 1/1939 | Di Vincenzo | B65F 1/141 248/274.1 |
| 2,894,622 | A * | 7/1959 | Poupitch | B65D 67/02 206/159 |
| 3,193,234 | A * | 7/1965 | Thurman | A47G 7/044 248/313 |
| 3,477,679 | A * | 11/1969 | Lovitz | A47B 96/061 248/213.2 |
| 3,966,056 | A * | 6/1976 | Larson | A47F 5/0018 211/134 |
| 3,979,007 | A * | 9/1976 | Thornbloom, Jr. | A45C 11/20 220/522 |
| 4,071,218 | A * | 1/1978 | Pecka | A47F 7/285 248/312.1 |
| 4,515,421 | A * | 5/1985 | Steffes | A45C 11/20 312/351 |

(Continued)

OTHER PUBLICATIONS

YETI Beverage Holder [online]. YETI Coolers, LLC 2018 [retrieved on Dec. 14, 2018]. Retrieved from the Internet: <URL: https://www.yeti.com/en_US/accessories/beverage-holder/20130010001.html?cgid=accessories#start=1>.

*Primary Examiner* — Christopher Garft
*Assistant Examiner* — Michael McDuffie
(74) *Attorney, Agent, or Firm* — Will Hunziker (57) ABSTRACT

An accessory is attachable to a container that does not interfere with a lid or cover of the container. The accessory includes a bracket mounted to a bucket portion of the container. The bracket can be used to attach various items to be supported by the bracket and the container.

13 Claims, 7 Drawing Sheets

(56) References Cited

U.S. PATENT DOCUMENTS

| | | | | |
|---|---|---|---|---|
| 4,697,780 A * | 10/1987 | Wenkman | B60N 3/103 | 248/558 |
| 4,762,114 A * | 8/1988 | Blankemeyer | A47J 37/0763 | 126/25 R |
| 4,825,590 A * | 5/1989 | Cullinane | A47G 7/044 | 248/229.16 |
| 5,104,080 A * | 4/1992 | Berger | A47J 37/0786 | 108/152 |
| 5,106,046 A * | 4/1992 | Rowles | B60N 3/103 | 248/214 |
| 5,129,615 A * | 7/1992 | Strauss | B60R 7/043 | 206/564 |
| 5,170,903 A * | 12/1992 | Fleming | B65F 1/141 | 220/23.4 |
| 5,333,322 A * | 8/1994 | Weir | E04H 4/14 | 4/496 |
| 5,368,267 A * | 11/1994 | Howard | A47G 7/044 | 248/208 |
| 5,551,558 A * | 9/1996 | Bureau | A45C 9/00 | 190/11 |
| 5,664,367 A * | 9/1997 | Huang | A01G 9/022 | 248/311.2 |
| 5,857,601 A * | 1/1999 | Greenwood | B62B 9/26 | 224/409 |
| 5,873,555 A * | 2/1999 | Grace | A47G 7/044 | 248/215 |
| 6,244,559 B1 * | 6/2001 | Stanton | A46B 17/02 | 15/246 |
| 6,315,149 B1 * | 11/2001 | Conrado | A45C 5/14 | 220/521 |
| 6,607,088 B2 * | 8/2003 | Cestrone | B65F 1/141 | 220/23.86 |
| 6,616,109 B1 * | 9/2003 | Jarrett | B65F 1/141 | 248/201 |
| 6,796,319 B1 * | 9/2004 | Patarra | A45B 11/00 | 108/138 |
| 6,929,225 B1 * | 8/2005 | Kent | B44D 3/123 | 211/65 |
| 7,299,667 B1 * | 11/2007 | Miresmaili | E05B 73/00 | 109/51 |
| 7,472,876 B2 * | 1/2009 | Jones | A47B 96/061 | 108/108 |
| 7,878,364 B1 * | 2/2011 | Anderson | A47L 13/51 | 220/23.4 |
| 8,919,715 B2 * | 12/2014 | Terada | A47B 96/028 | 108/115 |
| 9,732,550 B2 * | 8/2017 | Lubotta | F25D 3/08 | |
| 10,563,907 B2 * | 2/2020 | Hixon | B65D 25/2841 | |
| 2002/0100848 A1 * | 8/2002 | Ahl | E06C 7/146 | 248/211 |
| 2005/0017142 A1 * | 1/2005 | Ogden | E04D 13/1625 | 248/247 |
| 2007/0158346 A1 * | 7/2007 | Crutchfield | B65F 1/141 | 220/23.4 |
| 2010/0171019 A1 * | 7/2010 | Funston | B65F 1/141 | 248/312.1 |
| 2012/0061411 A1 * | 3/2012 | Singh | E04H 4/14 | 220/737 |
| 2014/0299616 A1 * | 10/2014 | Perseilin | B65F 1/141 | 220/737 |
| 2016/0015176 A1 * | 1/2016 | Cano | A47B 57/404 | 248/213.2 |
| 2018/0073801 A1 * | 3/2018 | Murphy | F16M 13/02 | |
| 2019/0127109 A1 * | 5/2019 | Johnson | B65D 25/04 | |

\* cited by examiner

UTILITY BRACKET FOR PORTABLE STORAGE CONTAINERS

RELATED APPLICATIONS

This application claims the benefit of U.S. provisional patent application Ser. No. 62/564,440, filed Sep. 28, 2017, the entire contents of which are hereby incorporated by reference herein.

STATEMENT REGARDING FEDERALLY SPONSORED RESEARCH OR DEVELOPMENT (Not Applicable)

BACKGROUND

Some portable storage containers, such as coolers that can be used with vehicles, such as automobiles and boats, are insulated and have lids, some of which are hinged. The lid is closed onto the container to obtain a closed, insulated environment to maintain a temperature for stored items (e.g., cold or hot).

Some coolers are large and take up a fair amount of space in vehicles. It may be desirable to have a stable surface to store cups while using such a container, including a cooler, while obtaining beverages from the container for example. However, the lid is generally unusable for such surface, since it is moved or removed to obtain access to the container interior.

Some such portable storage containers include openings on a surface below and/or beneath the lid that are used for carrying the container or securing it to the vehicle. The openings are sometimes used to mount a single cupholder.

SUMMARY

An accessory to a portable storage container provides a bracket that mounts in or is fastened to an opening on a lip of a bucket portion of the container. The bracket can support various attachments that can be used to store items. The bracket permits additional storage, receptacles or fasteners to be mounted on the container, without interfering with the operation of the lid. A removable fastener permits various attachments to be attached to the bracket.

In some examples, the bracket is shaped as a right angle, with one (mounting) side being mountable in the opening on the lip of the bucket portion of the container, and with another side projecting outward away from the container when mounted. The projecting side can include a notch that fits snugly around a portion of the lip of the bucket portion. The notch may provide additional support and stability for the bracket and any object mounted to the bracket.

In some examples, the mounting side of the bracket that mounts in the opening of the lip of the container may be shaped to obtain a snug and stable fit in the opening. For example, the bracket may include a tapered mounting side that tapers from smaller than a dimension of the lip opening to the size or larger than the lip opening. Such a tapered mounting side fits in the lip opening easily at a tip and snugly at an end that is distal from the tip. The mounting side may include material that is resilient or spring loaded to engage the opening sides, top or bottom of the opening and/or lip. The mounting side of the bracket may include a latch that is engaged resiliently or spring loaded with the opening and/or the lip, and released via a latch release. The latch or other objects or materials included on the mounting side of the bracket may be used to stabilize the bracket on the container.

A cross-section of the mounting side of the bracket may have dimensions of 1.375 in ×0.575 in (35 mm×14.6 mm). The bracket may be made of any suitable material that provides rigidity and/or support for an attached object. The bracket may have openings or other structures on the mounting side or projecting side that contribute to securing the bracket to the container, or to securing an object to the bracket.

In some examples, the bracket is used to mount an object to the container. The object may be a shelf, which may be mounted to the edge of the container. The shelf may have a recess or channel to receive the bracket. The removable fastener fastens the shelf to the bracket.

In some examples, the object is a shelf that includes openings, such as through openings. The openings can operate as cupholders, e.g., for receiving cups or other beverage containers. The openings can be sized and shaped to receive an item that is stably mounted to the container. For example, fishing rods, tools or other items that may be used in conjunction with the container, the vehicle or various functions may be stably mounted via openings in the shelf connected to the container with the bracket. The shelf may additionally, or alternatively, have other mounting devices, such as hooks, snaps, hook and loop fasteners, spring clips and any other type of mounting or fastening device that can secure items to the shelf and thus the container via the bracket.

The shelf may have major dimensions of 7 in ×18 in (17.78 cm×45.72 cm) and a depth of about 0.25 in (0.635 cm) to about 5 in (12.7 cm) or greater. Objects mounted to the container with the bracket may have any useful size and shape. The objects may be configured to have a slot, channel, recess or any other structure that cooperates with a projecting side of the bracket to mount the object to the bracket. The object structure, e.g., slot, channel or recess, permits the object to be slid on and off the bracket. An opening or other structure such as a detent may be provided on the mounting side of the bracket (or on the object) that can register with a cooperative opening or other structure on the object (or on the bracket). The openings in the bracket and/or the object, or other structures on either or both the bracket and/or the object can be used to secure the object to the bracket once the bracket is inserted into the object structure.

In some examples, the object may be mounted to the bracket so that the bracket is flush with the object. For example, there may be a slot provided in the bracket or the object to receive a complementary protrusion from the other of the object or the bracket. The slot may be configured so that the bracket, for example, is flushly aligned with a surface of the object so as to present a contiguous surface. In addition, or alternatively, the object may be arranged to be mounted to the bracket to be flush with the container or a surface of the container or lid. For example, the object may be a shelf that operates as an extension of the top of the lid or the lip of the bucket portion of the container.

In some examples, the bracket and the object mounted to the bracket are integral and/or designed to be used as a single item. In other examples, the bracket and the object are releasably fastened to each other.

The object mounted to the bracket may have a channel that this composed of a different material than the object. For example, the object mounted to the bracket may be a wooden shelf, which has a U-channel for receiving the bracket. The U-channel may be formed of metal, and be secured to the wooden shelf with screws or other fasteners. The metal U-channel is shaped to receive the bracket for stably mounting the wooden shelf on the bracket. The bracket can be fastened to the metal U-channel to affix the wooden shelf to the bracket.

The opening in the lip of the container bucket portion is capable of receiving various accessory components, such as locking or tie down devices. The bracket discussed herein can be adapted to replace portions of the locking or tie down devices while operating as a mount for an object on the container. To permit the bracket to replace a tie down or locking device, for example, an end of the mounting side of the bracket is angled outward away from the container. The angle may be from about 0 degrees to about 45 degrees, and preferably about 12 degrees. An opening, including a through opening, may be arranged in the angled portion of the mounting side of the bracket. The opening is suitable for receiving a tie-down device, such as a cord, or a lock, such as a padlock, to lock the container. The lock being inserted through the opening and fastened can prevent the bracket from being removed from the container.

Other useful objects that may be mounted to the bracket include cutting boards, ice trays or buckets, and any other utile objects. The container may have several openings in the lip or other parts of the bucket portion of the container that may be used for mounting brackets as discussed herein. Where several openings are available, they may be used in coordination with respective brackets to mount larger objects. For example, two or more brackets may be employed with two or more respective or associated openings to mount an object supported by the two or more brackets.

The shelf provides a stable place to put cups for holding while using cooler to make drinks etc. The shelf can also be designed to hold fishing rods or serve as a cutting board. Cooler Shelves-Attachable shelves for the sides of high end coolers (Yeti, Igloo, Engel etc. . . . ). The shelves serve as cupholders, rodholders, cutting boards. In some examples, the shelves attach to cooler with and inverted "L" bracket and U-channel.

High End Coolers (Yeti, Igloo, Engel etc. . . . ) all have a slot or opening on the side of the cooler rim where the top (lid) meets the bottom (bucket portion) for tie-down brackets or roping. These slots and tie-downs secure the coolers in moving vechicles such as automobiles or boats. These slots measure roughly 1⅜ inches (37 mm) by ½ inch (14 mm). Using this slot an inverted "L" shaped bracket, which may be composed of aluminum, slides into the slot. In some examples, a longer part (4-5 inches) of the "L" slides down into and through the slot leaving the shorter part (3-4 inches) of the "L" at a right angle. This bracket is fitted with slot that receives the rim of the bottom part, allowing it to be secure with little movement. The right angle part of the bracket fits between the space of the cooler top (closing) and bottom allow the cooler to function as normal. The right angle of the bracket serves as a male adaptor to the female U-channel bracket that is mounted to the bottom of the shelf (7 inches by 18 inches, which may vary depending on cooler size, for example). The male adapter cooperates with the complementary U-channel to permit the shelf to slide onto the bracket. In some examples, the U-Channel is mounted to the shelf with four stainless steel screws. On the top of the shelf is mounted a spring plunger, which may be composed of stainless steel, that can be used to fasten or latch the shelf onto the "L" bracket via a hole drilled into the bracket. The plunger indexes into the hole when in registration to latch the shelf to the bracket. This arrangement stably secures the shelf to the bracket to permit the shelf to be free from movement in relation to the cooler. The shelf can be easily removed by pulling on the spring plunger to index the plunger out of the hole, which permits the shelf to slide off of the "L" bracket. The shelf can be stored in the cooler or bag for transport. The "L" bracket can remain on the cooler for transport using the cooler handles—e.g., the bracket does not interfere with the cooler handles.

BRIEF DESCRIPTION OF THE SEVERAL VIEWS OF THE DRAWINGS

The disclosure is described in greater detail below, with reference to the accompanying drawings, in which.

DETAILED DESCRIPTION

Figure 1:
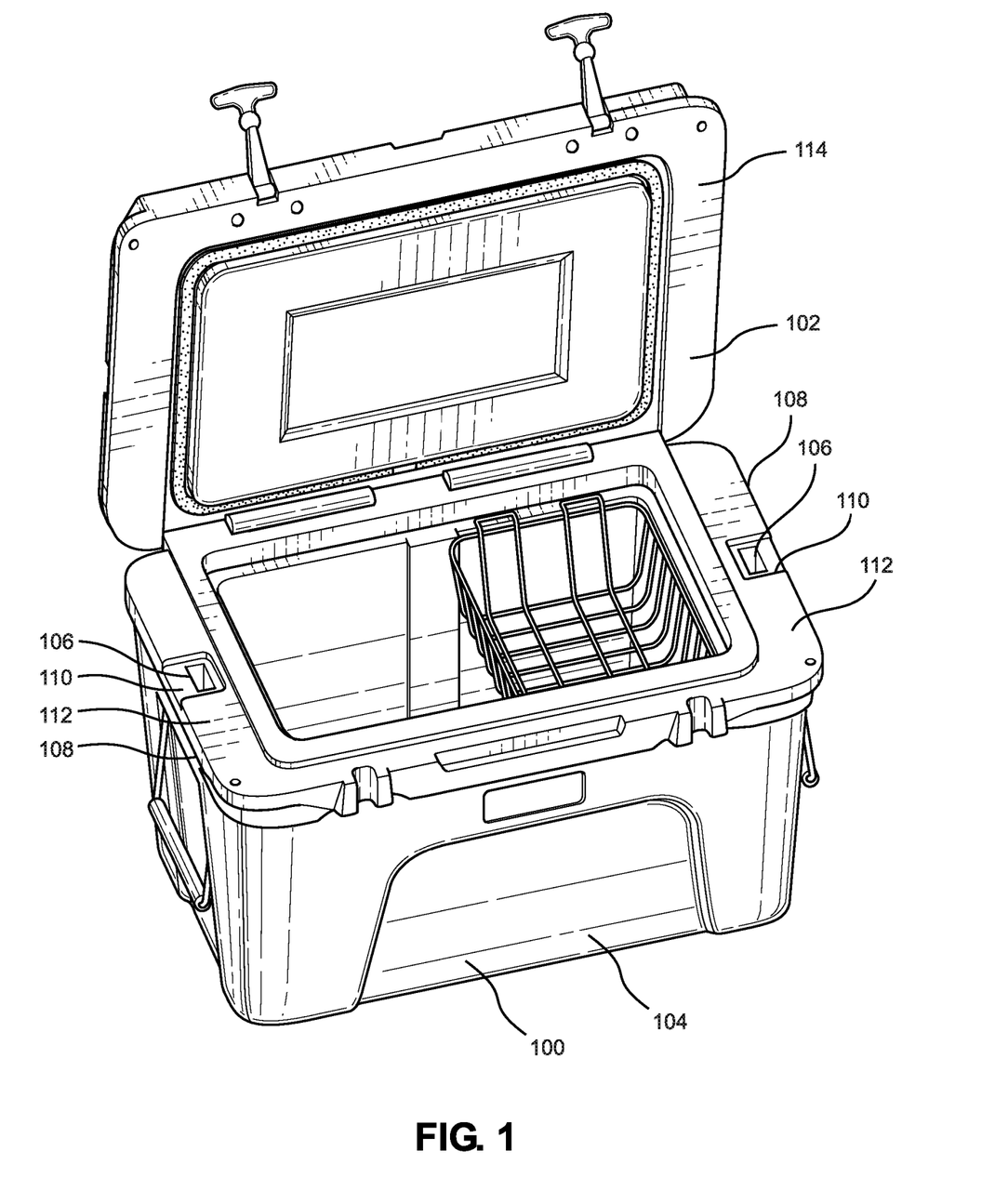
FIG. 1 is an isometric view of a container with a hinged lid and a bucket portion that has openings at an outer lip or rim.

FIG. 1 is an isometric view of a container 100 with a hinged lid 102 and a bucket portion 104 that has openings 106 at an outer lip or rim 108. Around openings 106 is a recessed surface 110 that corresponds to a thinner portion of rim 108. Bucket portion 104 includes an upper surface 112, which is shaped and arranged to mate or engage a lower surface 114 of lid 102. Surfaces 112, 114 fit together to help form an insulation barrier when lid 102 is closed onto bucket portion 104. Recessed surface 110 provides a space or clearance between upper surface 112 and lower surface 114 when lid 102 is closed onto bucket portion 104. The clearance permits items such as straps used for tie-downs to be threaded through openings 106, while not interfering with the closure of lid 102 on bucket portion 104, and while not interfering with engagement or cooperation of surfaces 112, 114.

Figure 2:
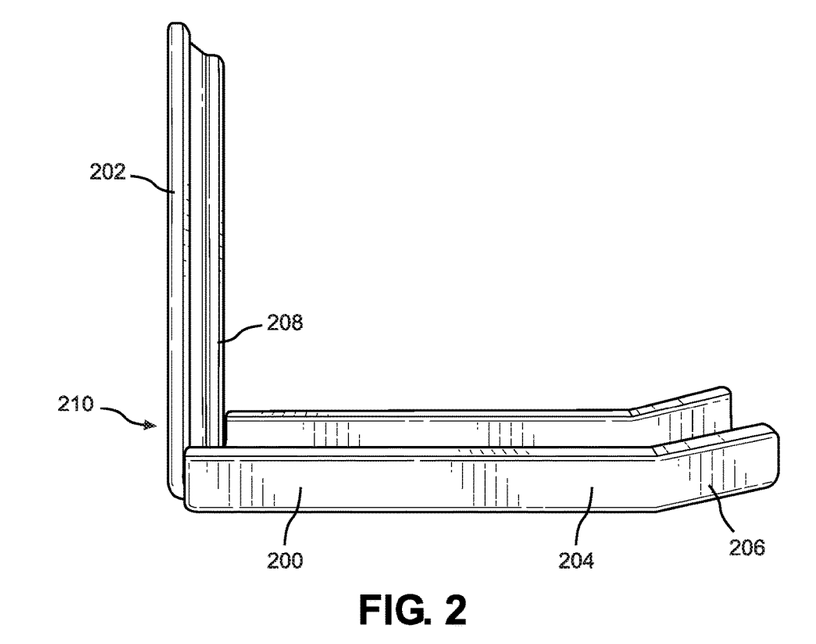
FIG. 2 is a side view of a bracket according to an example embodiment with an angled flange on a shank.
Figure 3:
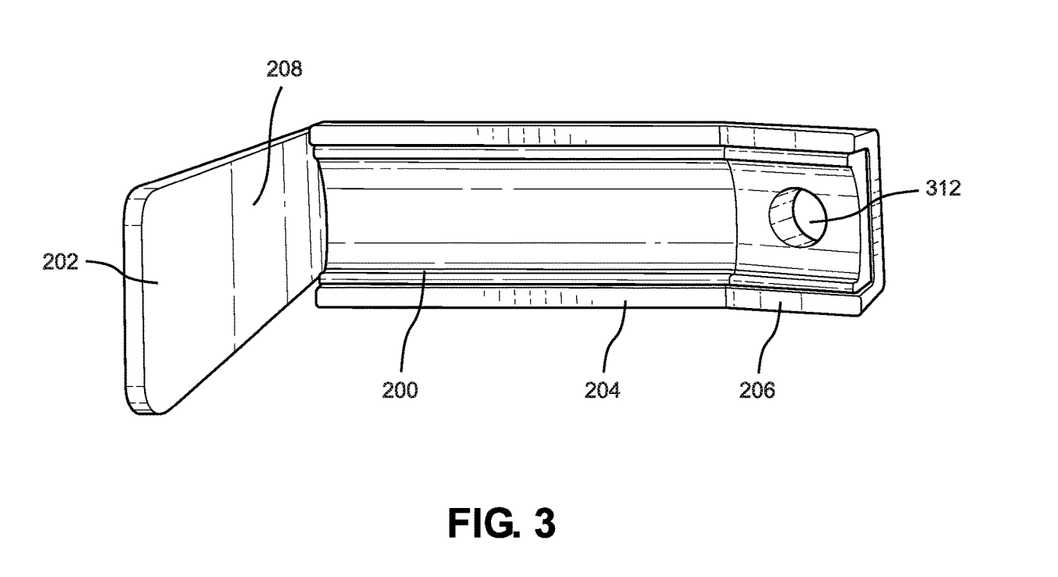
FIG. 3 is a top plan view of the bracket of FIG. 2.

Referring now to FIGS. 2 and 3, an example aluminum "L" bracket 200 is illustrated. Bracket 200 includes a shank 204 and a support 202. Shank 204 includes a tang 206 that is arranged at an angle with respect to shank 204. The angle between tang 206 and shank 204 may be from about 0 degrees to about 45 degrees. Tang 206 includes through opening 312, which can be used as an attachment structure for contributing to securing container 100 via bracket 200 when bracket 200 is placed in opening 106.

The angle of tang 206 contributes to spacing opening 312 away from bucket portion 104 to permit greater/easier access to opening 312. The angle of tang 206 can contribute to maintaining bracket 200 in opening 106 when not otherwise secured. Tang 206 prevents or obstructs shank 204 from being removed from opening 106 in a vertical direction. Removal of shank 204 from opening 106 can be achieved by moving bracket 200 in a vertical direction, and then rotating bracket 200 in a direction to align tang 206 with opening 106 to permit full removal.

Bracket 200 is designed to permit shank 204 and tang 206 to be placed in opening 106, so that an inner surface 208 of support 202 rests on recessed surface 110. An outer surface 210 of support 202 near an end of shank 204 is designed to be lower than or flush with upper surface 112, so that support 202 does not cause interference or obstruction for closing lid 102 onto bucket portion 104 to permit surfaces 112, 114 to cooperate or engage.

Figure 4:
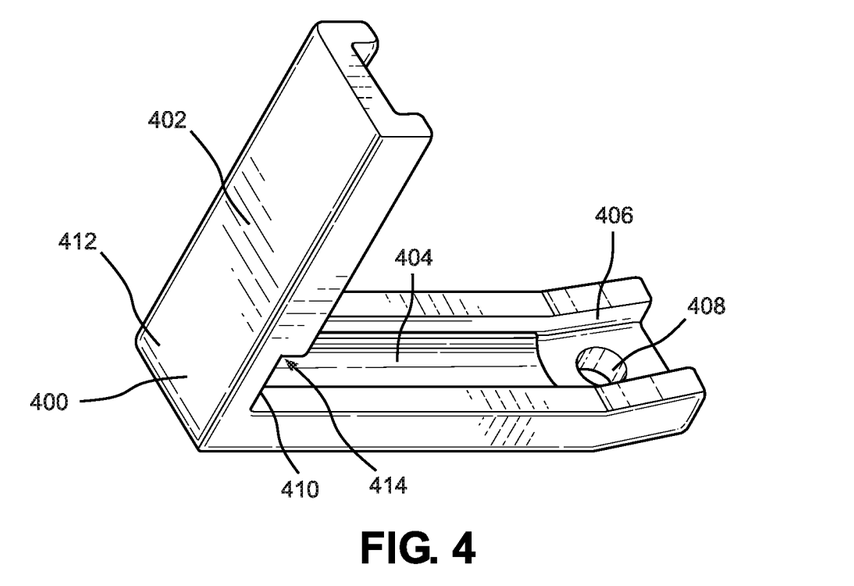
FIG. 4 is an isometric view of a bracket according to an example implementation.
Figure 5:
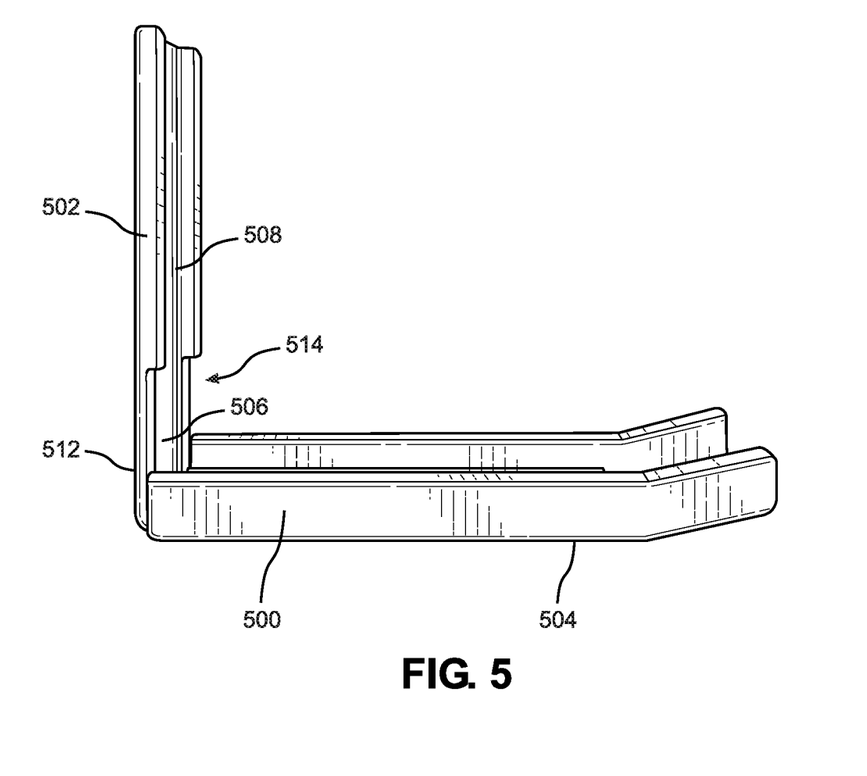
FIG. 5 is a side view of a bracket according to an example embodiment.
Figure 6:
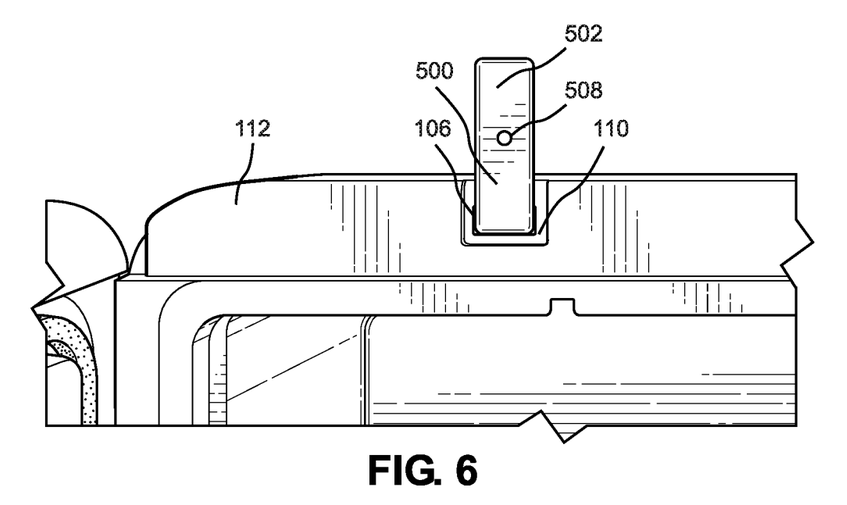
FIG. 6 is plan view of the bracket installed on the container.
Figure 7:
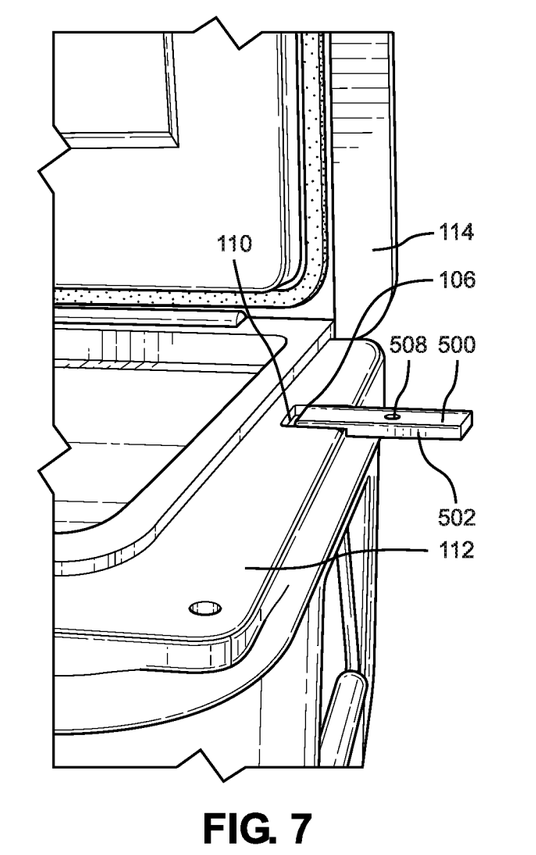
FIG. 7 is a perspective view of the bracket installed on the container.
Figure 8:
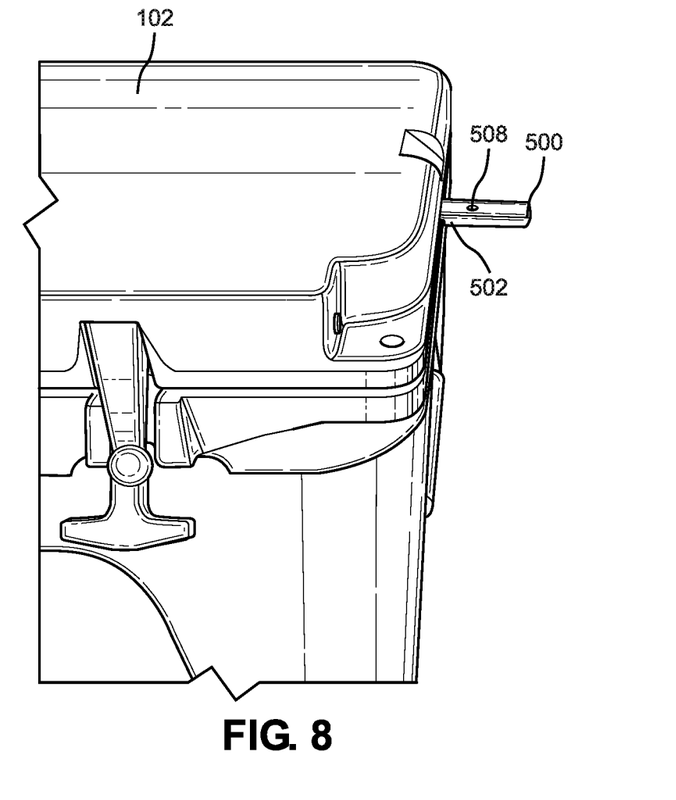
FIG. 8 is the view of FIG. 6 with the container lid closed.

Referring now to FIG. 4, an example "L" bracket 400 is illustrated. Bracket 400 can be made, at least partly, out of any suitable material that is rigid and capable of supporting a certain amount of weight or moment force without bending or deforming significantly. Some examples of such material include metals and metal alloys, polymers, resins, rubber, composites, such as fiber reinforced materials, wood and/or combinations. The material(s) can be weather resistant, such as stainless steel, galvanized material and the like. Although the above example of bracket 200 is executed in aluminum, any suitable material, including those listed above, can be used.

Bracket 400 includes a shank 404 and a support 402. Shank 404 includes a tang 406 that is arranged at an angle with respect to shank 404. The angle between tang 406 and shank 404 may be from about 0 degrees to about 45 degrees. Tang 406 includes through opening 408, which can be used as an attachment structure for contributing to securing container 100 via bracket 400 when bracket 400 is placed in opening 106.

The angle of tang 406 contributes to spacing opening 408 away from bucket portion 104 to permit greater/easier access to opening 408. The angle of tang 406 can contribute to maintaining bracket 400 in opening 106 when not otherwise secured. Tang 406 prevents or obstructs shank 404 from being removed from opening 106 in a vertical direction. Removal of shank 404 from opening 106 can be achieved by moving bracket 400 in a vertical direction, and then rotating bracket 400 in a direction to align tang 406 with opening 106 to permit full removal.

Bracket 400 is designed to permit shank 404 and tang 406 to be placed in opening 106, so that an inner surface 410 of support 402 rests on recessed surface 110. An outer surface 412 of support 402 near an end of shank 404 is designed to be lower than or flush with upper surface 112, so that support 402 does not cause interference or obstruction for closing lid 102 onto bucket portion 104 to permit surfaces 112, 114 to cooperate or engage.

Inner surface 410 may be located in a notch 414 that is shaped and sized to fit over a span of recessed surface 110 between opening 106 and lip 108. The dimensions of notch 414 can be set so that a snug fit between notch 414, opening 106 and lip 108 is achieved. Such a snug fit contributes to maintaining bracket 400 in position, and can help to support loading applied to bracket 400.

Referring now to FIGS. 5, 6, 7 and 8, an example "L" bracket 500 is illustrated. Bracket 500 is constructed of aluminum channel material, but can alternatively be composed of any suitable material(s), such as any of those described for bracket 400.

Bracket 500 includes a shank 504 and a support 502. Support 502 includes through opening 508, which can be used as an attachment structure for contributing to securing accessories to bracket 500.

Bracket 500 is designed to permit shank 504 to be placed in opening 106, so that an inner surface 506 of support 502 rests on recessed surface 110. An outer surface 512 of support 502 near an end of shank 504 is designed to be lower than or flush with upper surface 112, so that support 502 does not cause interference or obstruction for closing lid 102 onto bucket portion 104 to permit surfaces 112, 114 to cooperate or engage.

Inner surface 506 may be located in a notch 514 that is shaped and sized to fit over a span of recessed surface 110 between opening 106 and lip 108. The dimensions of notch 514 can be set so that a snug fit between notch 514, opening 106 and lip 108 is achieved. Such a snug fit contributes to maintaining bracket 500 in position, and can help to support loading applied to bracket 500.

Figure 9:
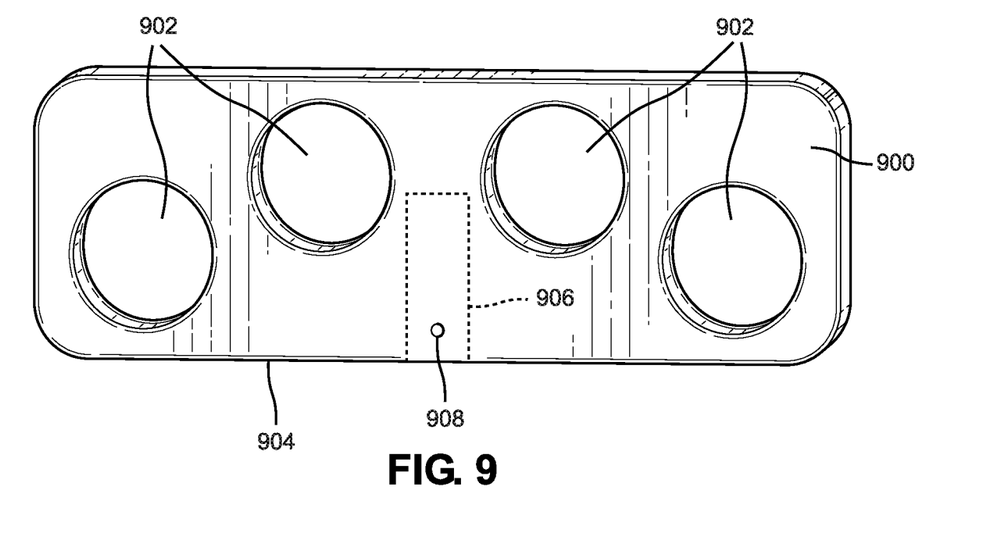
FIG. 9 is a plan view of an accessory implemented as a shelf.
Figure 10:
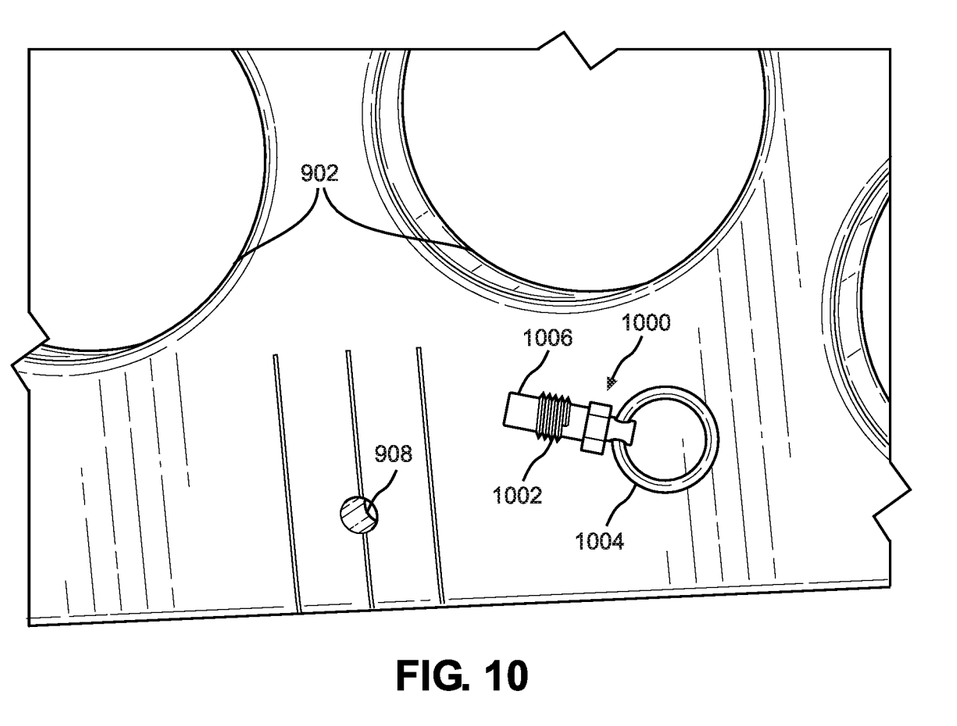
FIG. 10 is a sectional plan view of the shelf showing an opening and spring plunger that fits in the opening.

Referring to FIGS. 9 and 10, a shelf 900 is illustrated for use as an accessory with any of brackets 200, 400 or 500. Shelf 900 includes circular recesses 902 that can serve as cup holders. An opening 908 is shown near an edge 904. Opening 908 may be a through or closed opening, e.g. a cavity, that communicates with an internal slot 906 extending internally into shelf 900.

A removable or releasable fastener 1000 can be implemented as a spring loaded pull pin or spring plunger. A spring (not shown) biases a shaft 1006 to extend outward from fastener 1000. Fastener 1000 includes threads 1002 that permit fastener 1000 to be affixed in opening 908 so as to permit shaft 1006 to index within opening 908 in internal slot 906. A ring 1004 is connected to and can retract shaft 1006 when urged against the bias of the internal spring. In operation, internal slot 906 is sized and shaped to receive support 502 (or 202 or 402). As support 502 is inserted into internal slot 906, ring 1004 is pulled to retract shaft 1006. Retracted shaft 1006 does not interfere or obstruct the insertion of support 502 into internal slot 906. Upon opening 508 registering with opening 908, ring 1004 can be released to permit shaft 1006 to extend into opening 908, thus securing shelf 900 to bracket 500. Shelf 900 can be released from bracket 500 by pulling on ring 1004 to retract shaft 1006 to be free of opening 508. With shaft 1006 being free of opening 508, support 502 can be withdrawn from internal slot 906, and shelf 900 can thus be removed from bracket 500.

Figure 11:
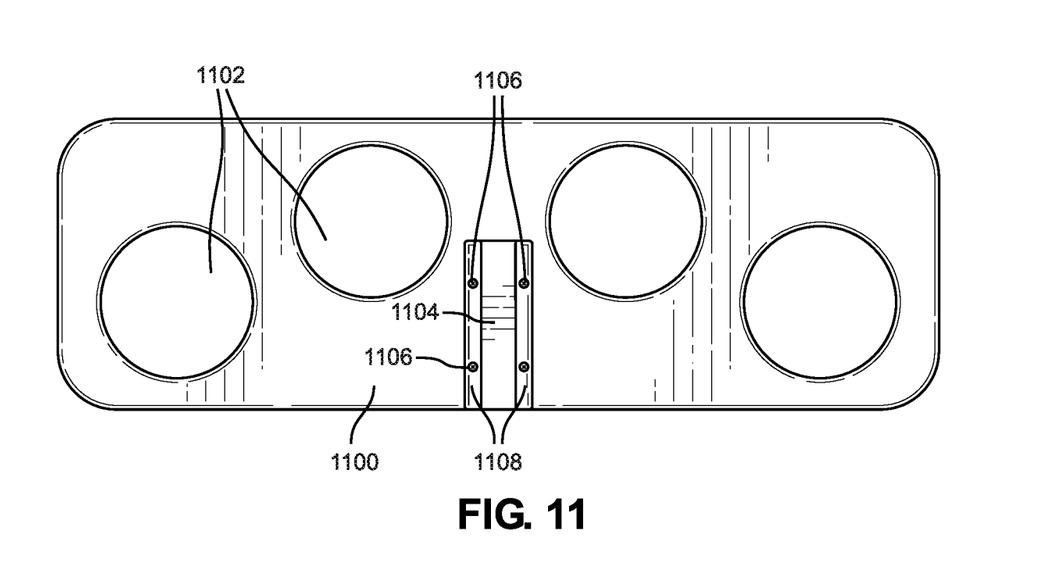
FIG. 11 is a bottom plan view of the shelf showing a channel for receiving the bracket.

Referring to FIG. 11, an example shelf 1100 is illustrated. Shelf 1100 includes a number of circular openings 1102. Openings 1102 can be in the form of shallow recesses for, e.g., cup holders, or can be in the form of through openings that can be used for additional functions, including holding fishing rods.

Shelf 1100 includes an internal support 1104 that is secured to shelf 1100 via rails 1108 with screws 1106. Internal support 1104 is configured to permit shelf 1100 to securely receive a mating support, such as support 202, 402 or 502, which can engage with internal support 1104 to secure shelf 100 to support 202, 402 or 502. Alternatively, or in addition, internal support 1104 is part of an "L"-shaped channel bracket that includes a shank configured to be received in opening 106 of container 100. In such an example implementation, support 1104 and associated bracket are integral with shelf 1100. Such a design can eliminate fastener 1000.

Figure 12:
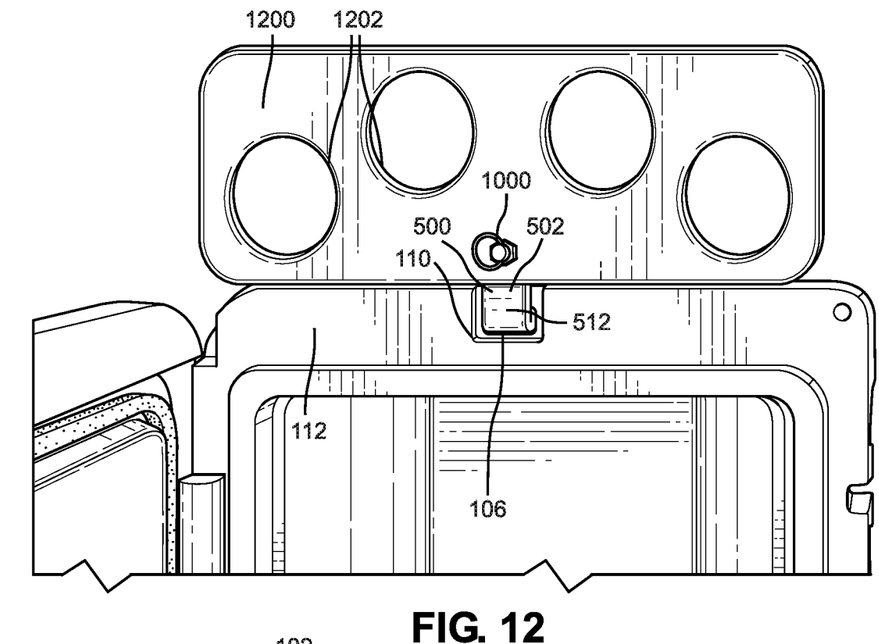
FIG. 12 is a plan view of the shelf installed on the container.
Figure 13:
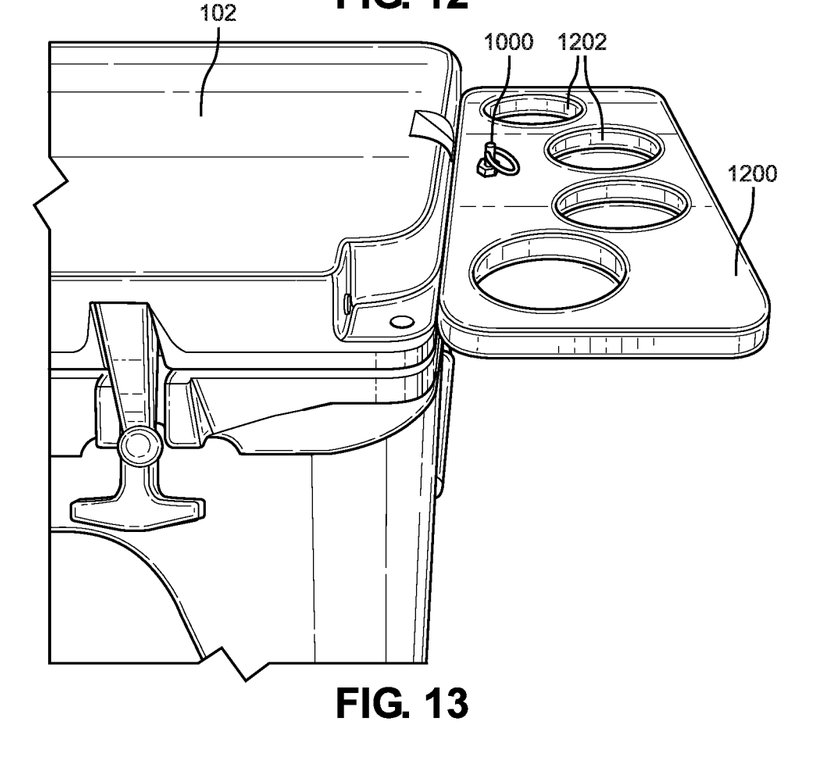
FIG. 13 is a perspective view of the shelf installed on the container with the container lid closed.

Referring now to FIGS. 12 and 13, a shelf 1200 is shown mounted to a container 100 in accordance with implementations and techniques discussed herein. Shelf 1200 includes through openings 1202 that can serve as cup holders or equipment retainers, such as fishing rod holders. Fastener 1000 is in an extended state, where the internal spring of fastener 1000 urges shaft 1006 to extend into opening 508 in support 502, thereby securing shelf 1200 to bracket 500. Support 502 includes an outer surface 512 that is flush with or slightly lower than upper surface 112. This configuration allows lid 102 to close without bracket 500 or shelf 1200 obstructing the closure.

The arrangement of bracket 500 and shelf 1200 can be configured so that a top surface of shelf 1200 is flush or contiguous with upper surface 112, or with a top surface of lid 102. Such an arrangement can be advantageous with accessories such as cutting boards, where a greater useable area can be obtained.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

What is claimed is:

1. A system including an accessory, and a container with a lid and a bucket portion, the bucket portion including a lip on at least one side of a top part of the bucket portion and a through opening in the lip extending downward and another connected recessed outward opening from the lip and a lid that that goes over the through opening on the lip and is flat above the connected recessed outward opening from the lip, the accessory comprising: an integral L shaped bracket with two extensions at a right angle to each other; a first one of the extensions being configured to cooperate with the through opening in the lip of the bucket portion for support; and a second one of the extensions being configured to extend away from the bucket portion when the first one of the extensions cooperates with the through opening, a notch in the second one of the extensions, wherein said second extension accommodates said connected recessed outward opening and is configured to provide support and stability for the bracket and to permit the lid to close flat against the lip of the bucket portion with the bracket extending between the lid and the bucket.

2. The system of claim 1, further comprising a shelf.

3. The system of claim 1, further comprising a cup holder.

4. The system of claim 1, further comprising a cutting board.

5. The system of claim 1, further comprising a fishing rod holder.

6. The system of claim 1, further comprising an attachment structure on the second one of the extensions configured to support a plurality of attachments.

7. The system of claim 6, wherein one of said plurality of attachments is a shelf.

8. The system of claim 6, wherein one of said plurality of attachments is a cup holder.

9. The system of claim 6, wherein one of said plurality of attachments is a cutting board.

10. The system of claim 6, wherein one of said plurality of attachments is a fishing rod holder.

11. The system of claim 1, wherein said container is a cooler.

12. The system of claim 1, wherein said first one of the extensions is tapered to allow quick installation through the opening in the lip of the bucket portion.

13. The system of claim 1, further comprising a retaining device on the first one of the extensions for retaining the bracket in the through opening in the lip of the bucket portion.

\* \* \* \* \*